United States Patent
Hasegawa et al.

(10) Patent No.: US 8,366,010 B2
(45) Date of Patent: Feb. 5, 2013

(54) MAGNETOMECHANICAL SENSOR ELEMENT AND APPLICATION THEREOF IN ELECTRONIC ARTICLE SURVEILLANCE AND DETECTION SYSTEM

(75) Inventors: Ryusuke Hasegawa, Morristown, NJ (US); Ronald Joseph Martis, East Hanover, NJ (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 13/171,968

(22) Filed: Jun. 29, 2011

(65) Prior Publication Data

US 2013/0001314 A1    Jan. 3, 2013

(51) Int. Cl.
*G06K 19/06* (2006.01)

(52) U.S. Cl. ........ 235/493; 235/375; 235/449; 235/451; 235/492

(58) Field of Classification Search .................. 235/449, 235/493, 375, 451, 492
See application file for complete search history.

(56) References Cited

U.S. PATENT DOCUMENTS

| | | |
|---|---|---|
| 4,142,571 A | 3/1979 | Narasimhan |
| 4,510,489 A | 4/1985 | Anderson, III et al. |
| 4,510,490 A | 4/1985 | Anderson, III et al. |
| 5,495,231 A | 2/1996 | Hasegawa |
| 5,539,380 A | 7/1996 | Hasegawa et al. |
| 5,628,840 A | 5/1997 | Hasegawa |
| 5,650,023 A | 7/1997 | Hasegawa et al. |
| 6,093,261 A | 7/2000 | Hasegawa et al. |
| 6,187,112 B1 | 2/2001 | Hasegawa et al. |
| 6,299,702 B1 | 10/2001 | Herzer |
| 6,359,563 B1 | 3/2002 | Herzer |
| 6,792,666 B1 * | 9/2004 | Bolotinsky et al. .......... 29/602.1 |
| 7,205,893 B2 | 4/2007 | Hasegawa et al. |
| 7,320,433 B2 | 1/2008 | Hasegawa |
| 7,561,043 B2 | 7/2009 | Hasegawa et al. |

OTHER PUBLICATIONS

Written Opinion of the International Searching Authority mailed Jul. 18, 2012 issued in corresponding International Patent Application No. PCT/US12/44350.
International Search Report mailed Jul. 18, 2012 issued in corresponding International Patent Application No. PCT/US12/44350.

* cited by examiner

*Primary Examiner* — Tuyen K Vo

(57) ABSTRACT

A magnetomechanical resonance element or marker strip with facilitated performance based on an amorphous magnetostrictive alloy ribbon having a line-like surface pattern is utilized in an electronic article surveillance marker or sensor element. A direction of magnetic anisotropy at angle between 80 and 90 degree away from ribbon's length direction and in ribbon's plane is introduced during ribbon fabrication, which increases the resonance performance with minimal loss in the magneto-mechanical circuit, and more particularly, in a marker or sensor element utilizing a plurality of resonating elements or marker strips. A marker or sensor element is fabricated utilizing the resonance element or elements and is utilized in an electronic article surveillance and identification systems.

14 Claims, 9 Drawing Sheets

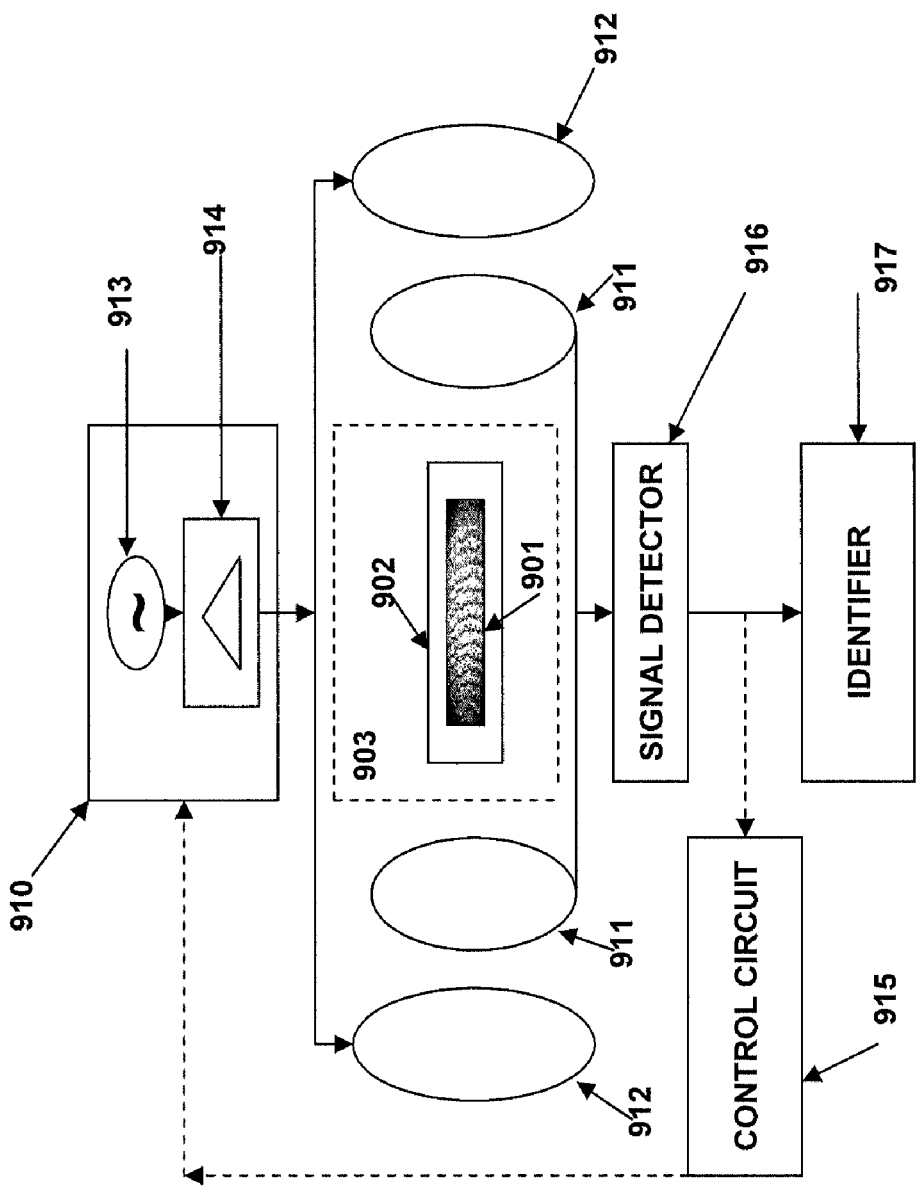

MAGNETOMECHANICAL SENSOR ELEMENT AND APPLICATION THEREOF IN ELECTRONIC ARTICLE SURVEILLANCE AND DETECTION SYSTEM

BACKGROUND

1. Field

The present invention relates to ferromagnetic amorphous alloy ribbon and to a magnetomechanical sensor element, also known as a marker or a tag, for use in an electronic article surveillance system, and an electronic article identification system, the sensor element comprising one or a plurality of rectangular strips based on an amorphous magnetostrictive material that vibrates in an alternating magnetic field mechanically at a resonant frequency varying with an applied static magnetic field, whereby the magnetomechanical effect of the marker is effectively utilized. The present invention is also directed to an electronic article surveillance system and an electronic article identification system utilizing such a sensor.

2. Background

Magnetostriction of a magnetic material is a phenomenon in which a dimensional change takes place upon application of an external magnetic field on the magnetic material. When the dimensional change is such that the material elongates upon its being magnetized, the material is termed "positive-magnetostrictive". When a material is "negative-magnetostrictive", the material shrinks upon its magnetization. Thus in either case, a magnetic material vibrates when it is in an alternating magnetic field. When a static magnetic field is applied along with the alternating magnetic field, the frequency of the mechanical vibration of the magnetic material varies with the applied static field through magneto-elastic coupling. This is commonly known as $\Delta E$ effect, which is described, for example, in "Physics of Magnetism" by S. Chikazumi (John Wiley & Sons, New York, 1964, page 435). Here, E(H) stands for Young's modulus, which is a function of the applied magnetic field H. The material's vibrational or resonance frequency $f_r$ is related to E(H) through the equation:

$$f_r = (1/2l)[E(H)/\rho]^{1/2} \quad (1),$$

where l is the length of the material, and $\rho$ is the mass density of the material.

The magneto-elastic or magneto-mechanical effect described above is utilized in electronic article surveillance systems which were first taught in U.S. Pat. Nos. 4,510,489 and 4,510,490 (hereinafter, the '489 and '490 patents). Such surveillance systems are advantageous in that they offer a combination of high detection sensitivity, high operating reliability and low operating costs.

A marker in such systems is a strip, or a plurality of strips, of known length of a ferromagnetic material, packaged with a magnetically harder ferromagnet (material with a higher coercivity) that provides a static field termed as bias field to establish magneto-mechanical coupling. The ferromagnetic marker material is preferably a magnetostrictive amorphous alloy ribbon, since the efficiency of magneto-mechanical coupling in the magnetostrictive amorphous alloys is very high. The mechanical resonance frequency, $f_r$, is determined essentially by the length of the alloy ribbon and the bias field strength, as Equation (1) above indicates.

When an interrogating signal tuned to the resonance frequency is encountered in the electronic article surveillance system, the marker material responds with a large signal field which is detected by a receiver in the system.

Several amorphous ferromagnetic materials were considered for electronic article surveillance systems based on magnetomechanical resonance described above in the '489 and '490 patents, including amorphous Fe—Ni—Mo—B, Fe—Co—B—Si, Fe—B—Si—C and Fe—B—Si alloys. Of the alloys, a commercially available amorphous Fe—Ni—Mo—B based METGLAS®2826 MB alloy was used extensively until accidental triggering, by a magnetomechanical resonance marker, of other systems based on magnetic harmonic generation/detection. This occurs because a magnetomechanical resonance marker used at that time sometimes exhibited non-linear BH characteristics, resulting in the generation of higher harmonics of the exciting field frequency. To avoid this problem, sometimes called a system "pollution problem," a series of new marker materials were invented, examples of which were disclosed in U.S. Pat. Nos. 5,495,231, 5,539,380, 5,628,840, 5,650,023, 6,093,261 and 6,187,112. Although the new marker materials perform, generally, better than the materials utilized in the surveillance systems of the original '489 and '490 patents, somewhat better magnetomechanical performance was found in the marker materials disclosed, for example, in U.S. Pat. No. 6,299,702 (hereinafter, the '702 patent). The new marker materials require complicated heat-treatment processes to achieve desired magnetomechanical properties as disclosed, for example, in the '702 patent. Clearly, a new magnetomechanical marker material was needed which did not require such complicated post-ribbon fabrication processes, and the inventions of U.S. Pat. No. 7,205,893 (hereinafter, the '893 patent), 7,320,433 (hereinafter, the '433 patent) and 7,561,043 (hereinafter, the '043 patent) provided such a marker material with high magnetomechanical performance without causing the "pollution problem" that is mentioned above. A marker strip in accordance with the '702 patent is widely used for a marker with two strips, as is disclosed in U.S. Pat. No. 6,359,563. Due to the fact that the two strips have the same radius of curvature along the strip width direction since each of them was processed in exactly the same way, in accordance with the '702 patent, the two strips touch each other at many points on the strip surfaces, damping the magnetomechanical vibration on the strips, and hence reducing the effectiveness of the marker. This drawback was ameliorated with the '893, '433 and '043 patents. In maximizing the magnetomechanical resonance effect on which the '893, '433 and '043 patents are based, a new aspect controlling the effect has been discovered, which is the basis of the present invention. This invention, therefore, further enhances the magnetomechanical resonance effect utilized in the '893, '433 and '043 patents. Furthermore, there is a need for an effective electronic article surveillance system which utilizes such a marker.

SUMMARY

In accordance with an embodiment of the invention, a soft magnetic material is utilized for a marker or a sensor element of an electronic article surveillance and identification systems based on magnetomechanical resonance.

A marker material with enhanced overall magnetomechanical resonance properties is fabricated from an amorphous alloy ribbon. The magnetic marker material in a ribbon form having magnetomechanical resonance capability is cast on a rotating substrate as taught in U.S. Pat. No. 4,142,571 (hereinafter, the '571 patent). When the as-cast ribbon width is wider than the predetermined width for a marker material, said ribbon is slit to said predetermined width. The ribbon thus prepared is cut into ductile, rectangular amorphous metal marker strips having a predetermined length to fabricate a magnetomechanical resonance marker using one or a plurality of said marker strips with at least one semi-hard magnet strip which provides a bias static magnetic field.

An electronic article surveillance system utilizes a marker or a sensor element in accordance with an embodiment of the present invention. The system has an article interrogation zone in which a magnetomechanical marker or sensor element of the present invention is subject to an interrogating magnetic field at the resonance frequency of a marker strip, the signal response to the interrogating magnetic field excitation being detected by a receiver having a pair of antenna coils situated in the article interrogation zone. The received magnetomechanical resonance signal is then processed by a signal detection circuit which identifies the marker.

In accordance with an embodiment of the invention, a sensor element or a marker of a magnetomechanical resonant electronic article surveillance system, comprises: at least one ductile magnetostrictive strip cut from an amorphous ferromagnetic alloy ribbon. The ribbon has a ribbon length direction, a ribbon plane, and a line-like surface pattern, and the surface pattern has a surface line direction. The at least one marker strip has a direction of magnetic anisotropy being at an angle between 80 and 90 degree away from the ribbon length direction and in the ribbon plane, and the surface line direction coincides with the direction of magnetic anisotropy, which is introduced during ribbon casting by adjusting casting conditions. The at least one marker strip exhibits a magnetomechanical resonance under alternating magnetic field excitation with a static bias field.

In accordance with an embodiment of the invention, the amorphous ferromagnetic alloy ribbon has a saturation induction ranging from 0.8 tesla to 1.0 tesla.

In accordance with an embodiment of the invention, the amorphous ferromagnetic alloy ribbon has a saturation magnetostriction ranging from 9 ppm to 14 ppm.

In accordance with an embodiment of the invention, the amorphous ferromagnetic alloy ribbon has a composition based on $Fe_a$—$Ni_b$—$Mo_c$-$B_d$ with $35 \leq a \leq 42$, $38 \leq b \leq 45$, $0 \leq c \leq 5$, $11 < d \leq 17$ and $a+b+c+d=100$, up to 3 atom % of Mo being optionally replaced by Co, Cr, Mn and/or Nb and up to 1.5 atom % of B being optionally replaced by Si and/or C.

In accordance with an embodiment of the invention, the amorphous ferromagnetic alloy ribbon is an alloy having a composition of one of $Fe_{41.3}Ni_{38.2}Mo_{3.6}B_{16.3}Si_{0.6}$, $Fe_{37.6}Ni_{44.9}Mo_{4.4}B_{11.5}Si_{1.35}Co_{0.1}Cr_{0.15}$, $Fe_{37.2}Ni_{41.2}Mo_{3.6}B_{16.1}Si_{0.9}O_{0.6}Co_{0.1}Cr_{0.3}$, $Fe_{37.1}Ni_{42.2}Mo_{3.7}B_{16.3}Si_{0.7}$, $Fe_{36.9}Ni_{42.0}Mo_{3.9}B_{16.2}Si_{0.7}Co_{0.1}Cr_{0.2}$, $Fe_{36.4}Ni_{42.6}Mo_{3.9}B_{15.9}Si_{0.9}Cr_{0.3}$, $Fe_{36.0}Ni_{42.3}Mo_{3.9}B_{16.6}Si_{0.8}Co_{0.1}Cr_{0.3}$, and $Fe_{35.8}Ni_{43.5}Mo_{3.5}B_{16.4}Si_{0.6}Co_{0.1}Cr_{0.1}$.

In accordance with an embodiment of the invention, the at least one marker strip has a discrete length and exhibits magnetomechanical resonance at a length-related frequency.

Where selected, the at least one marker strip has a length ranging from about 35 to about 40 mm.

Where selected, the at least one marker strip has a marker strip width ranging from about 5 mm to about 8 mm.

Where selected, the plurality of marker strips is stacked as shown in FIG. 1 or placed side-by-side.

In accordance with an embodiment of the invention, the at least one marker strip has a characteristic time constant for magnetomechanical resonance signal decay ranging from 1 ms to 2 ms.

In accordance with an embodiment of the invention, the at least one marker strip has a resonance frequency shift exceeding 1.9 kHz from its minimum resonance frequency to its near highest observable resonance frequency.

Where selected, at least one bias magnet strip is placed along the at least one marker strip's direction.

In accordance with an embodiment of the invention, the at least one marker strip is housed in a cavity separated from the bias magnet strip.

In accordance with another embodiment of the invention, an electronic article surveillance system has a capability of detecting resonance of a sensor element or marker, and comprises a surveillance system tuned to predetermined surveillance magnetic field frequencies, wherein the surveillance system is capable of detecting a magnetomechanical resonance from a marker. The sensor element or marker is adapted to mechanically resonate at a preselected frequency, and has at least one ductile magnetostrictive marker strip cut from an amorphous ferromagnetic alloy ribbon. The ribbon has a ribbon length direction, a ribbon plane, and a line-like surface pattern, and the surface pattern has a surface line direction. The at least one marker strip has a magnetic anisotropy direction being at an angle between 80 and 90 degree away from the ribbon length direction and in the ribbon plane, and the surface line direction coincides with the direction of magnetic anisotropy, which is introduced during ribbon casting by adjusting casting conditions. The at least one marker strip exhibits a magnetomechanical resonance under an alternating magnetic field excitation with a static bias field.

BRIEF DESCRIPTION OF THE DRAWINGS

The invention will be more fully understood and further advantages will become apparent when reference is made to the following detailed description of the preferred embodiments and the accompanying drawings in which:

FIG. 9 is a schematic illustration of an electronic article surveillance system of an embodiment of the present invention.

DESCRIPTION OF THE EMBODIMENTS

Figure 1:
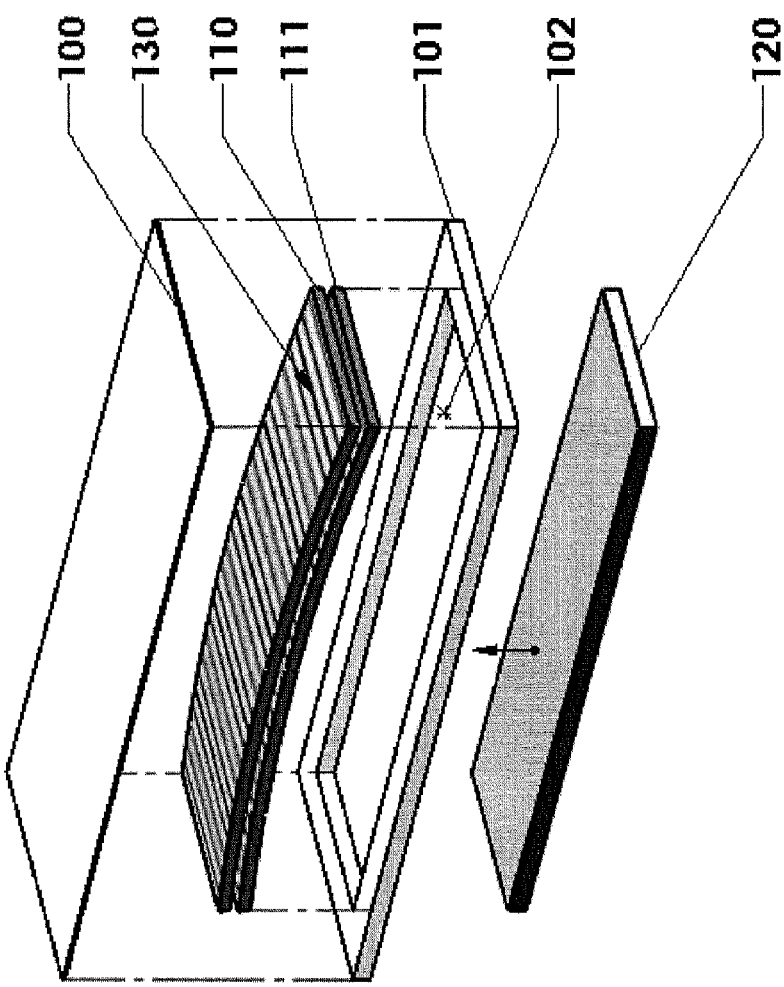
FIG. 1 is a perspective view showing an electronic article surveillance marker tag or sensor element in accordance with an embodiment of the present invention utilizing two magnetomechanical resonance strips with surface pattern.

A marker material with enhanced overall magnetomechanical resonance properties is fabricated from an amorphous alloy ribbon. The magnetic marker material in a ribbon form having magnetomechanical resonance capability is cast on a rotating substrate as taught in the '571 patent. When the as-cast ribbon width is wider than the predetermined width for a marker material, the ribbon is slit to the predetermined width. The ribbon thus prepared is cut into ductile, rectangular amorphous metal strips having a predetermined length to fabricate a magnetomechanical resonance marker using one or a plurality of the strips with at least one semi-hard magnet strip which provides a bias static magnetic field. A basic electronic article surveillance marker tag in accordance with an embodiment of the present invention is shown in FIG. 1, where 100 and 101 are outside covers, 110 and 111 are rectangular amorphous metal strips which are stacked as indicated and are inserted in the cavity area 102. 130 is a line-like surface pattern on the rectangular amorphous metal strip 110. Metal strip 111 has a similar line-like pattern on its surface. 120 is a bias magnet piece which is inserted into the cavity area 102, in such a way that the amorphous metal strips, 110 and 111 are capable of mechanical vibration free from physical constraints. In one embodiment of the present invention, the amorphous ferromagnetic alloy utilized to form a ribbon for the marker strip has a composition based on $Fe_a$—$Ni_b$—$Mo_c$-$B_d$ with $35 \leq a \leq 42$, $38 \leq b \leq 45$, $0 \leq c \leq 5$, $11 < d \leq 17$ and $a+b+c+d=100$, up to 3 atom % of Mo being optionally replaced by Co, Cr, Mn and/or Nb and up to 1.5 atom % of B being optionally replaced by Si and/or C.

In certain embodiments of the present invention, the amorphous ferromagnetic alloy utilized to form a ribbon for the marker strip has a composition of one of $Fe_{41.3}Ni_{38.2}Mo_{3.6}B_{16.3}Si_{0.6}$, $Fe_{37.6}Ni_{44.9}Mo_{4.4}B_{11.5}Si_{1.36}Co_{0.1}Cr_{0.16}$, $Fe_{37.2}Ni_{41.2}Mo_{3.6}B_{16.1}Si_{0.9}C_{0.6}Co_{0.1}Cr_{0.3}$, $Fe_{37.1}Ni_{42.2}Mo_{3.7}B_{16.3}Si_{0.7}$, $Fe_{36.9}Ni_{42.0}Mo_{3.9}B_{16.2}Si_{0.7}Co_{0.1}Cr_{0.2}$, $Fe_{36.4}Ni_{42.6}Mo_{3.9}B_{15.9}Si_{0.9}Cr_{0.3}$, $Fe_{36.0}Ni_{42.3}Mo_{3.9}B_{16.6}Si_{0.8}Co_{0.1}Cr_{0.3}$, and $Fe_{35.8}Ni_{43.5}Mo_{3.6}B_{16.4}Si_{0.6}Co_{0.1}Cr_{0.1}$. Thus, an amorphous magnetostrictive alloy having a chemical composition as defined earlier (that is, a composition based on $Fe_a$-$Ni_b$-$Mo_c$$B_d$ with $35 \leq a \leq 42$, $38 \leq b \leq 45$, $0 \leq c \leq 5$, $11 < d \leq 17$ and $a+b+c+d=100$, up to 3 atom % of Mo being optionally replaced by Co, Cr, Mn and/or Nb and up to 1.5 atom % of B being optionally replaced by Si and/or C) was cast in accordance with the techniques and methods described in the '571 patent. The cast ribbon had widths of about 100 mm, and its thickness was about 28 μm. The ribbon was then slit into narrower ribbons with different widths. The slit ribbon then was cut into ductile, rectangular strips having a length ranging from about 35 mm to about 40 mm. The cut ribbon strips were then characterized by the method described in Example 1.

Figure 2:
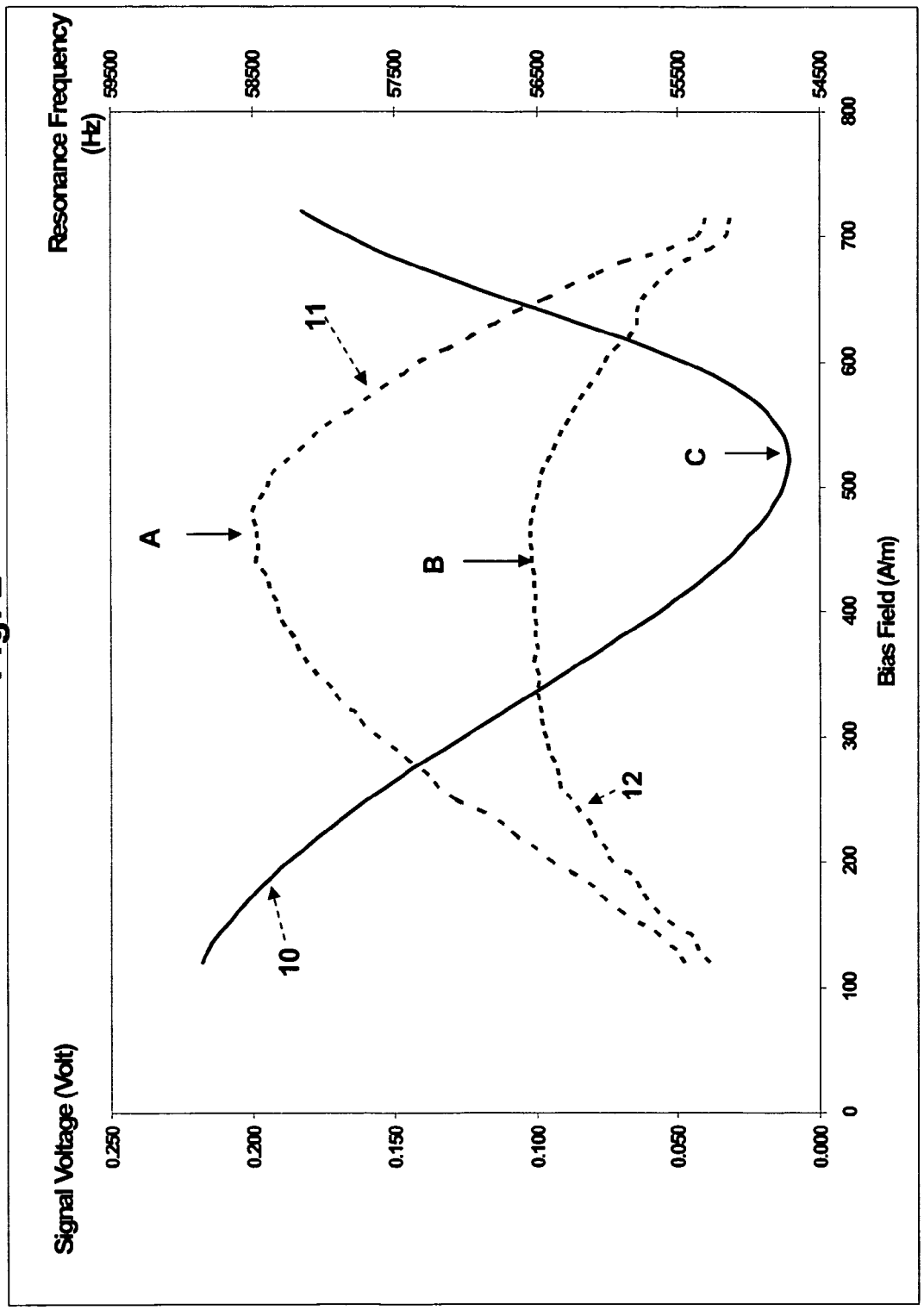
FIG. 2 is graph showing magnetomechanical resonance characteristics of a single strip marker in accordance with an embodiment of the present invention, indicating resonance frequency by curve 10, signal voltage at the onset of the termination of resonance excitation by curve 11 and signal voltage at 1 ms after the resonance excitation termination by curve 12.

FIG. 2 shows the magnetomechanical resonance characteristics of a typical amorphous alloy strip which is a candidate for the alloy ribbon of an embodiment of the present invention. The magnetomechanical resonance frequency, $f_r$, of the alloy strip is indicated by curve 10 as a function of bias magnetic field applied along strip's length direction. Curves 11 and 12 correspond to the signal voltages detected by the method described in Example 1 at the onset of the resonance excitation termination and at 1 msec after the termination of the resonance excitation, respectively. The points A and B correspond to the maximum signal voltages on Curves 11 and 12, respectively. The point C corresponds to the resonance frequency, $f_r$, which is the minimum on Curve 10. The magnetomechanical resonance properties of FIG. 2 were measured for the alloys of embodiments of the present invention having the chemical compositions of $Fe_a$—$Ni_b$—$Mo_c$-$B_d$ with $35 \leq a \leq 42$, $38 \leq b \leq 45$, $0 \leq c \leq 5$, $11 < d \leq 17$ and $a+b+c+d=100$, up to 3 atom % of Mo being optionally replaced by Co, Cr, Mn and/or Nb and up to 1.5 atom % of B being optionally replaced by Si and/or C. Table 1 is a list of the representative alloys in accordance with the present invention giving values of the saturation induction, $B_s$, which were determined by the method described in Example 2. FIG. 2 is the magnetomechanical resonance properties obtained for Alloy D of Table I.

TABLE I

| Alloy | Composition | Saturation Induction ($B_s$) |
|---|---|---|
| A | $Fe_{41.3}Ni_{38.2}Mo_{3.6}B_{15.3}Si_{0.6}$ | 0.93 |
| B | $Fe_{37.6}Ni_{44.9}Mo_{4.4}B_{11.5}Si_{1.35}Co_{0.1}Cr_{0.15}$ | 0.91 |
| C | $Fe_{37.2}Ni_{41.2}Mo_{3.6}B_{16.1}Si_{0.9}C_{0.6}Co_{0.1}Cr_{0.3}$ | 0.88 |
| D | $Fe_{37.2}Ni_{42.2}Mo_{3.7}B_{16.3}Si_{0.7}$ | 0.92 |
| E | $Fe_{36.9}Ni_{42.0}Mo_{3.9}B_{16.2}Si_{0.7}Co_{0.1}Cr_{0.2}$ | 0.94 |
| F | $Fe_{36.4}Ni_{42.6}Mo_{3.9}B_{15.9}Si_{0.9}Cr_{0.3}$ | 0.86 |
| G | $Fe_{36.0}Ni_{42.3}Mo_{3.9}B_{16.6}Si_{0.8}Co_{0.1}Cr_{0.3}$ | 0.80 |
| H | $Fe_{35.8}Ni_{43.5}Mo_{3.6}B_{16.4}Si_{0.6}Co_{0.1}Cr_{0.1}$ | 0.88 |

As shown in Table I, The amorphous alloy had a saturation induction ranging from about 0.8 Tesla to about 1.0 Tesla.

The magnetomechanical resonance properties characterized by the method of Example 1 of the ribbon strips cut from the alloys listed in Table I are summarized in Table II below. In this table, quantities, $f_r$ at $H_{min}$, and $H_{min}$ correspond to the resonance frequency and the bias magnetic field, respectively at point C in FIG. 2. The quantity FS is the resonance frequency shift from point C to the bias field of 120 A/m. $Ho_{max}$ is the bias field at which curve 10 is at its maximum value, $Vo_{max}$, as indicated by point A in FIG. 2. $H1_{max}$ is the bias field at which curve 11 is at its maximum value, $V1_{max}$, as indicated by point B in FIG. 2. The ratio of V1/Vo indicates the effectiveness of the magnetomechanical resonance of a ribbon strip as the ratio follows the following relationship:

$$V(t)/Vo = \exp(-t/\tau) \quad (2),$$

where t is the time measured after termination of an AC field excitation and τ is a characteristic time constant for the resonance signal decay and Vo is the resonance signal at t=0. Thus the quantity V1 defined above is the signal voltage detected at t=1 ms. Resonance marker strip width is given in the last column of Table II. Also included in this table is the resonance characteristics taken on commercial products prepared in accordance with the heat-treatment method described in the '702 patent.

TABLE II

| Alloy Ribbon Strip | $f_r$ at $H_{min}$ (kHz) | $H_{min}$ (A/m) | FS (kHz) | $Vo_{max}$ (mV) | $Ho_{max}$ (A/m) | $V1_{max}$ (mV) | $H1_{max}$ (A/m) | T (ms) | Strip Width (mm) |
|---|---|---|---|---|---|---|---|---|---|
| A-1 | 56.20 | 430 | 2.45 | 150 | 365 | 86 | 320 | 1.80 | 6 |
| A-2 | 56.60 | 460 | 1.91 | 137 | 420 | 86 | 400 | 1.64 | 6 |
| B-1 | 56.13 | 590 | 3.76 | 240 | 450 | 143 | 450 | 1.93 | 7 |
| C-1 | 56.61 | 520 | 3.90 | 156 | 520 | 89 | 450 | 1.78 | 6 |
| D-1 | 55.71 | 540 | 4.41 | 205 | 460 | 101 | 380 | 1.41 | 6 |
| E-1 | 55.06 | 359 | 3.55 | 214 | 240 | 90 | 320 | 1.16 | 6 |
| F-1 | 56.04 | 560 | 3.53 | 200 | 500 | 115 | 400 | 1.81 | 6 |
| G-1 | 56.30 | 490 | 3.20 | 320 | 490 | 183 | 330 | 1.79 | 7 |
| H-1 | 55.64 | 440 | 2.90 | 176 | 285 | 78 | 285 | 1.23 | 6 |
| G-2 | 56.53 | 420 | 1.02 | 80 | 400 | 37 | 400 | 1.59 | 6 |
| G-3 | 56.35 | 410 | 1.28 | 78 | 380 | 34 | 380 | 1.55 | 6 |
| Commercial Products | 55.60-56.76 | 520-580 | 2.05-4.18 | 140-205 | 440-500 | 60-102 | 360-420 | 1.53-1.76 | 6 |

The resonance characteristics depicted in FIG. 2 are important in designing a resonance marker with deactivation capability. An active surveillance marker tag has a bias magnet as shown in FIG. 1 so that it magnetomechanically resonates at a given frequency. During deactivation, the marker is subject to a bias field change resulting in a shift in the resonance frequency. The resonance frequency shift FS as defined above must be distinct so that deactivation is effective. It is considered that a resonance frequency shift exceeding 1.5 kHz is sufficient but for secure deactivation the lower limit for the required resonance frequency shift is set to 1.9 kHz in the present invention. By inspection of Table II above, the ribbon strips meeting the frequency shift $\geq 1.9$ kHz exhibited the resonance decay characteristic time $\tau$ of greater than 1 ms, indicating that these ribbon strips were effective in resonance signal retention, which was required in reliable electronic article surveillance. The ribbon strips G-2 and G-3 had chemical compositions within the scope of the embodiments of the present invention, indicating chemical compositions alone were not sufficient to provide the products in accordance with embodiments of the present invention. It is noted that, for Alloy strips G-2 and G-3, FS is lower than 1.9 kHz and signal voltage $V1_{max}$ is well below 50 mV which is too low for effective signal detection. Further experimentation was conducted to complete the invention as described below.

Figure 3:
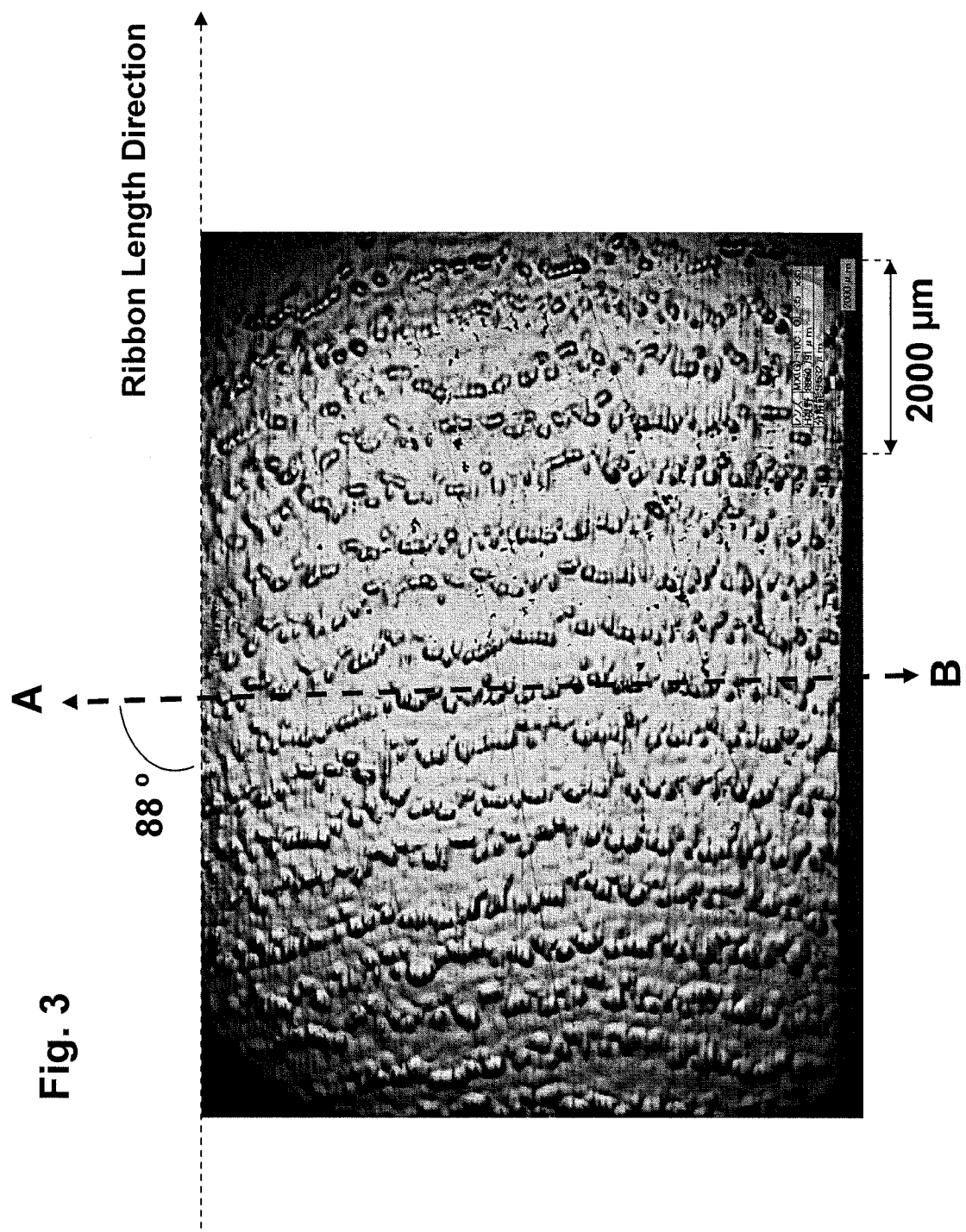
FIG. 3 is a laser microscopy image of ribbon surface facing liquid metal solidification surface for an amorphous metal ribbon of the present invention, indicating the magnetic anisotropy direction by the line AB, which is 88 degree away from the ribbon length direction, and the line AB coincides with the surface line direction.
Figure 4:
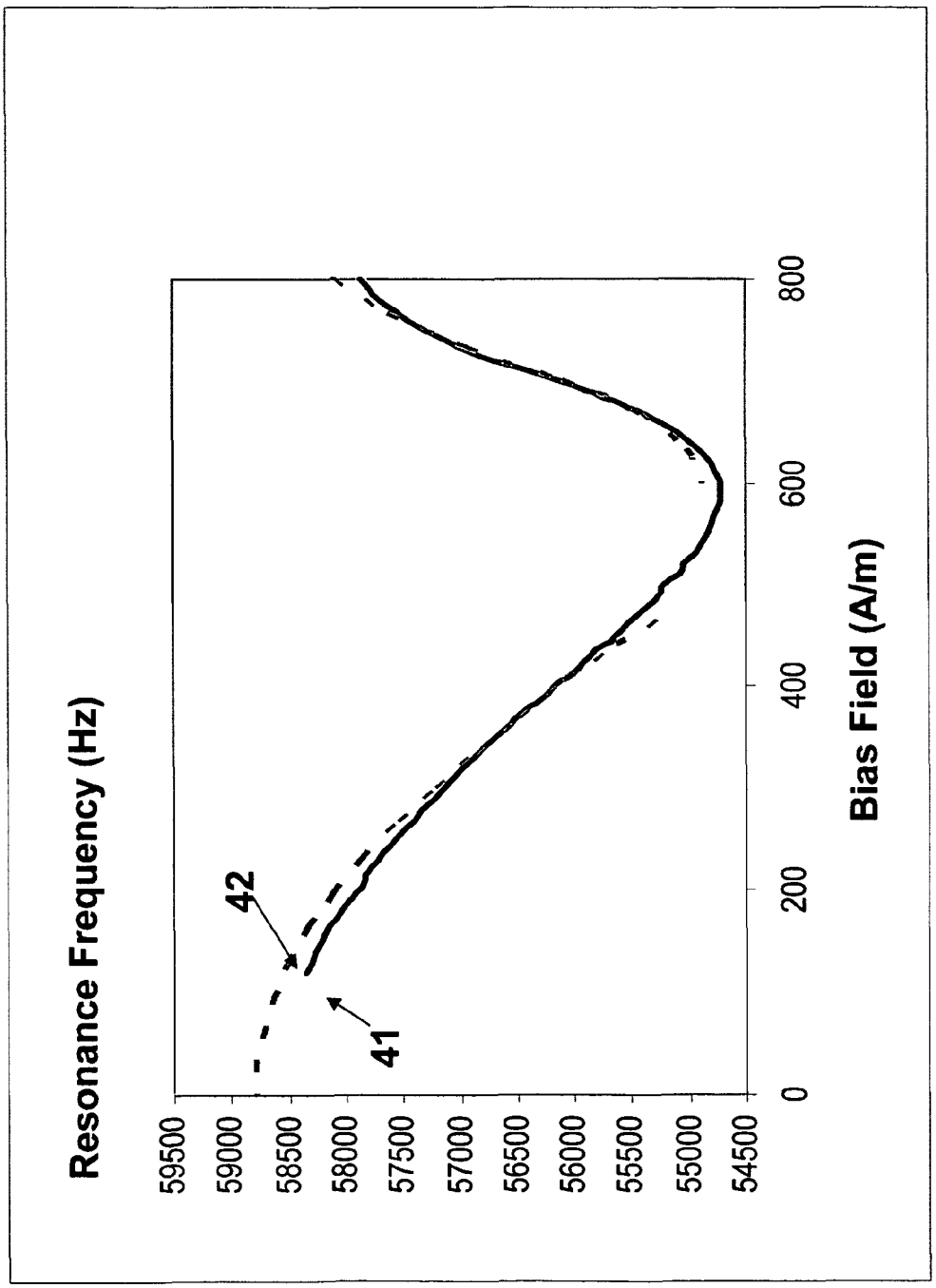
FIG. 4 is a graph showing magnetomechanical resonance characteristics of a single strip marker in accordance with an embodiment of the present invention for which FIG. 3 was taken, showing resonance frequency as a function of the bias field.
Figure 6:
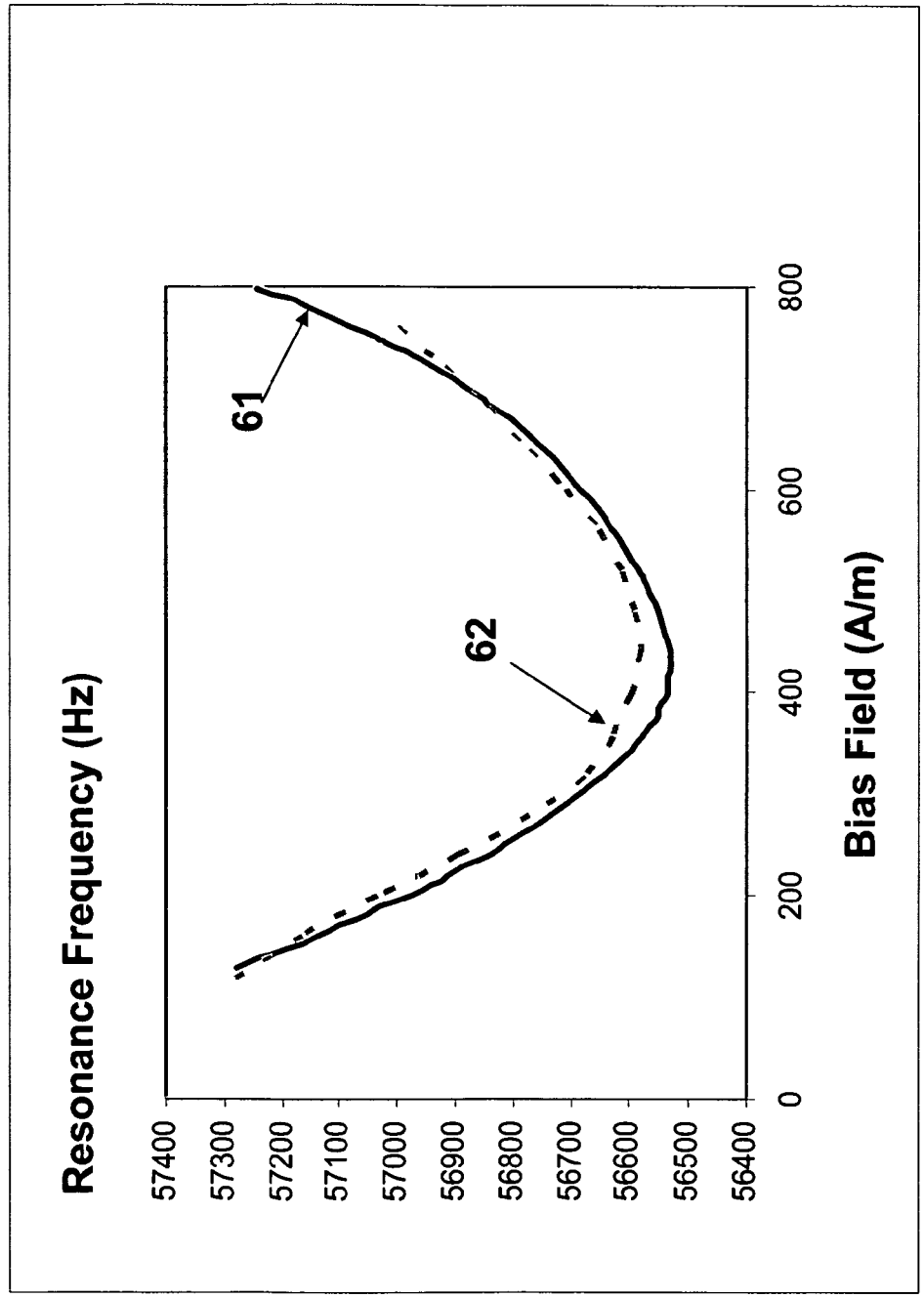
FIG. 6 is a graph shows magnetomechanical resonance characteristics of a single strip marker of FIG. 5, showing resonance frequency as a function of bias field.
Figure 7:
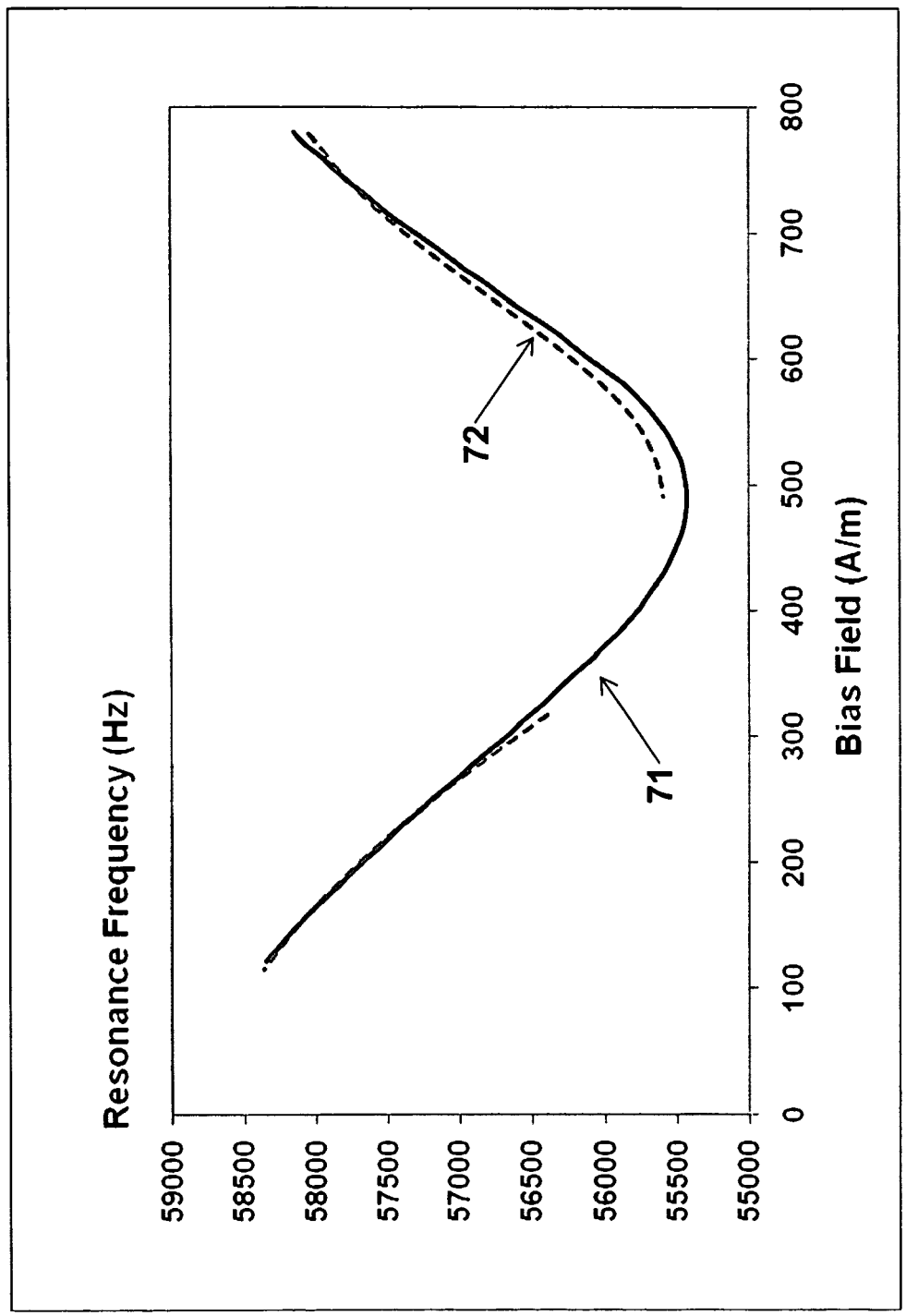
FIG. 7 is a graph showing an example of magnetomechanical resonance characteristics of a single strip marker of an embodiment of the present invention.
Figure 8:
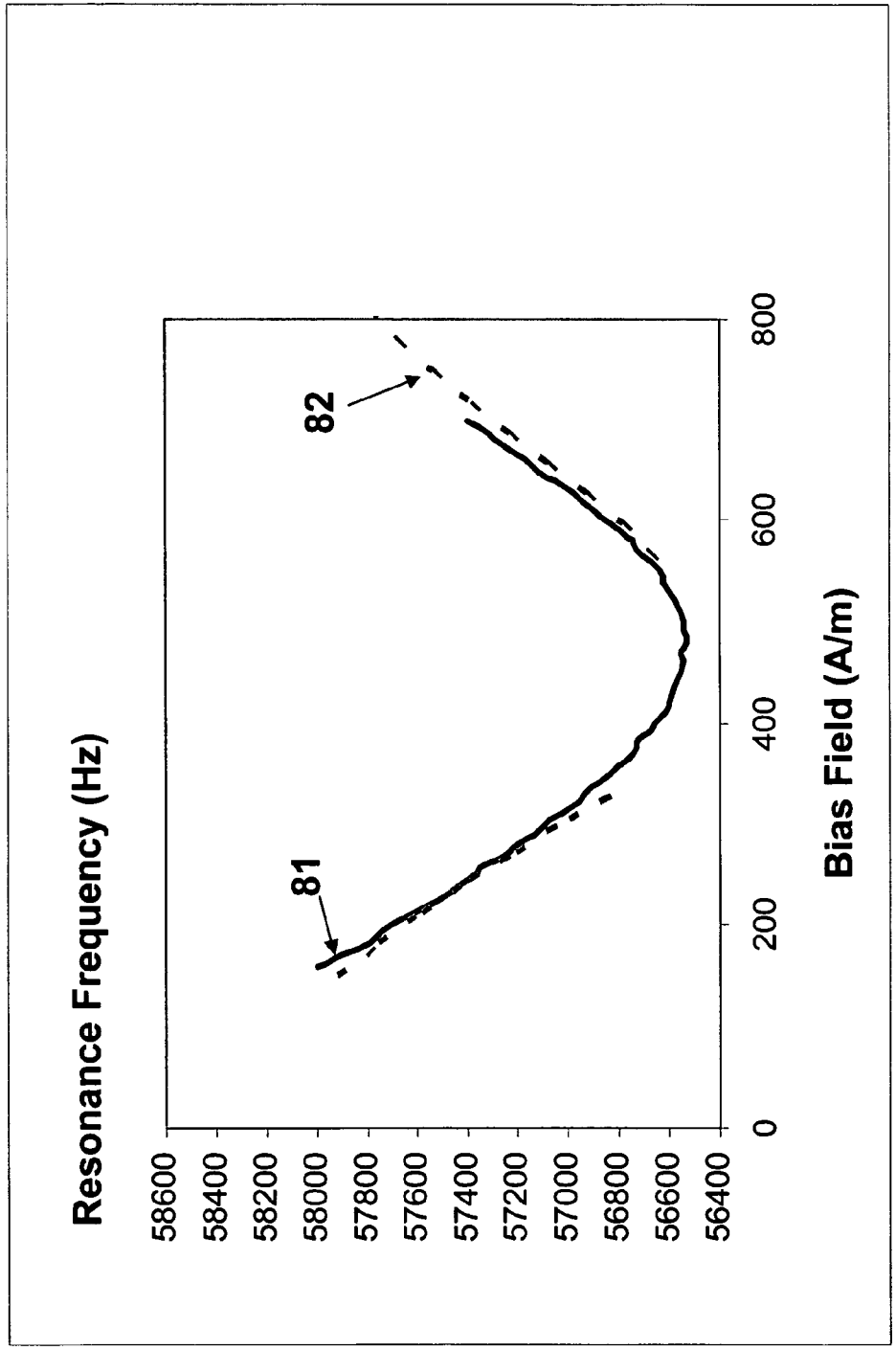
FIG. 8 is a graph showing an example of magnetomechanical resonance characteristics of a single strip marker of an embodiment of the present invention.

The casting process of the '571 patent involves molten metal puddle being quenched into a continuous ribbon rapidly cooled on the molten metal solidification surface which is basically a rotating wheel with a high thermal conductivity. Under these conditions, it is inevitable that molten metal puddle is not stationary but dynamic, often accompanied by periodic oscillation. This introduces periodic line-like surface pattern on cast ribbon surface which is faintly visible to naked eyes. FIG. 3 shows one such example. The line-like surface pattern, albeit quite faint to naked eyes but clear under laser microscopy as described in Example 3, was observed on the ribbon surface facing the molten metal solidification surface on the rotating chill wheel. The direction of the surface physical line was close to 90 degrees away from the ribbon's length direction. This kind of surface pattern is known in the science and technology of magnetic materials to affect the magnetic properties of the ribbon. According to embodiments of the invention, the effect was indeed reflected in the magnetomechanical resonance properties of this ribbon which was designated Alloy B in Table I. The magnetomechanical properties of Alloy B ribbon were characterized by using the following equation found in "Phenomemological Model for Magnetization, Magnetostriction and $\Delta E$ Effect in Field-Annealed Amorphous Ribbons" by P. T. Squire, *Journal of Magnetism and Magnetic Materials*, vol. 87, 299-310 (1990)":

$$E/E_s = 1/\{1+(9\lambda_s^2 E_s/8K)F(h;\theta,\gamma)\} \quad (3)$$

with $F(h; \theta,\gamma) = \{\sin^2 2(\theta-\phi_1)\}/\{\cos 2\phi_1 + h \cos(\theta-\phi_1) + 2\gamma \cos 2(\theta-\phi_1)\}$, where E is Young's modulus in Equation (1) above and $E_s$ is the saturation modulus, K is the magnetic anisotropy energy, h is equal to (applied field)/$(2K/M_s)$ with $M_s$ being saturation magnetization, $\gamma = 3\lambda_s\sigma/4K$ ($\sigma$:internal strain), $\theta$ is the angle of the magnetic anisotropy direction with respect to ribbon length direction and $\phi_1$ is the angle between the saturation magnetization $M_s$ and the direction of the magnetic anisotropy K. The magnetomechanical resonance data taken on a strip cut from ribbon Alloy B listed as Alloy Ribbon Strip B-1 in Table II was fitted to the above Equation (3) as shown in FIG. 4, where curve 41 was the measured curve and curve 42 was the curve calculated using Equation (3). From this curve fitting, $\theta=88$ degree resulted, which is indicated in FIG. 3 by the line AB. Thus the surface line direction of the surface pattern in FIG. 3 coincides with the direction of the magnetic anisotropy in the ribbon. Similar curve fitting was performed for a cut strip from ribbon Alloy G in Table I listed as Alloy Ribbon Strip G-2 in Table II, showing the line-like surface pattern of FIG. 5. The results of curve fitting are given in FIG. 6, where curve 61 is the measured curve and curve 62 is the curve calculated by using Equation (3), which indicates that the surface line direction coincides with the direction of the magnetic anisotropy in the ribbon which is 78-degree away from ribbon's length direction as indicated by line AB in FIG. 5. Similar curve fitting was performed on the ribbon strip G-1 of Table II, the result of which is shown in FIG. 7, where curve 71 was the measured curve and curve 72 was calculated by using Equation (3). In this case, the angle of the magnetic anisotropy, $\theta$, was 88 degree away from the ribbon length direction. Yet another curve fitting performed on the ribbon strip A-2 of Table II resulted in FIG. 8, where curve 81 was the measured curve and curve 82 was calculated by using Equation (3), indicating that $\theta=82$ degree. The surface pattern introduced during ribbon casting assures high level of magnetomechanical resonance performance of the cast ribbon. In addition, the surface pattern on the ribbon provides several technical advantages, such as making the quality control process faster and easier, resulting in considerable improvements in the ribbon production yield. For instance, in comparison, the products according to the '433, '893 and '043 patents require lengthy quality control due to the steps of slitting ribbon to a given width, cutting it to a predetermined length and measuring magnetomechanical resonance properties to determine if the ribbon meets the specifications. All or some of these extra steps in the quality control process for the products of the '433, '893 and '043 patents could be eliminated by using the ribbon with surface pattern according to embodiments of the present invention.

Magnetomechanical resonance curve fitting was performed for representative ribbons with the chemical compositions as defined earlier (that is, a composition based on $Fe_a$-$Ni_b$-$Mo_c$$B_d$ with $35 \leq a \leq 42$, $38 \leq b \leq 45$, $0 \leq c \leq 5$, $11 < d \leq 17$ and $a+b+c+d+=100$, up to 3 atom % of Mo being optionally replaced by Co, Cr, Mn and/or Nb and up to 1.5 atom % of B being optionally replaced by Si and/or C). The results of the curve fitting for the representative alloys listed in Table I are given in Table III:

TABLE III

| Alloy | $K_u$ (J/m³) | $\lambda_s$ (ppm) | $E_s$ ($10^{11}$ N/m²) | θ (degree) |
|---|---|---|---|---|
| A-1 | 650 | 14 | 1.47 | 85 |
| A-2 | 620 | 14 | 1.47 | 82 |
| B-1 | 330 | 11.5 | 1.49 | 88 |
| C-1 | 500 | 13 | 1.50 | 88 |
| D-1 | 290 | 11.5 | 1.50 | 87.5 |
| E-1 | 300 | 13 | 1.50 | 85 |
| F-1 | 400 | 11.5 | 1.49 | 88 |
| G-1 | 260 | 10 | 1.50 | 88 |
| H-1 | 400 | 11.5 | 1.49 | 88 |
| G-2 | 700 | 11.5 | 1.44 | 78 |
| G-3 | 500 | 11.5 | 1.44 | 78 |

Table III indicates the following: The magnetic anisotropy ranged from 250 J/m³ to 700 J/m³; the saturation magnetostriction $\lambda_s$ ranged from 9.5 ppm to 14.5 ppm; and the direction of the magnetic anisotropy with respect to ribbon's length direction θ ranged from 78 to 90 degrees. The quantity $E_s$ was close to $1.5 \times 10^{11}$ N/m². A comparison of the data in Table II and Table III gave the inventors of the present invention a preferred range of the direction of the magnetic anisotropy in the ribbon between 80 degrees and 90 degrees away from the ribbon length direction. Thus ribbon strips G-2 and G3 in Tables II and III are not suitable as a magnetomechanical resonance element in accordance with embodiments of the present invention because they showed $V1_{max}$ values of 37 and 34, respectively, although their chemical composition is within the preferred composition range as given earlier (that is, a composition based on $Fe_a$-$Ni_b$-$Mo_c$$B_d$ with $35 \leq a \leq 42$, $38 \leq b \leq 45$, $0 \leq c \leq 5$, $11 < d \leq 17$ and $a+b+c+d+=100$, up to 3 atom % of Mo being optionally replaced by Co, Cr, Mn and/or Nb and up to 1.5 atom % of B being optionally replaced by Si and/or C).

In one aspect of a magnetomechanical resonance element in accordance with embodiments of the present invention, the signal voltage emanating from the magnetic element was proportional to the volume of the element. For example, $Vo_{max}$ was in the range of 240 mV and 320 mV for the strips with width of 7 mm, whereas it was in the range of 150 mV and 214 mV for the strip width of 6 mm as Table II indicated. Thus if larger detection signals are needed, 7 mm is preferred for the width of the magnetomechanical element.

In actual electronic article surveillance systems currently used in the industry, a single or two-strip configuration is adopted. Thus the magnetomechanical properties of two-strip markers were evaluated using the performance tests of Example 1 and the results are listed in Table IV. The first letter such as A corresponds to the alloy listed in Table 1.

TABLE IV

| Two Ribbon Strips | $f_r$ at $H_{min}$ (kHz) | $H_{min}$ (A/m) | FS (kHz) | $Vo_{max}$ (mV) | $Ho_{max}$ (A/m) | $V1_{max}$ (mV) | $H1_{max}$ (A/m) | T (ms) | Strip Width (mm) |
|---|---|---|---|---|---|---|---|---|---|
| A-3 | 57.88 | 570 | 2.07 | 250 | 530 | 180 | 490 | 2.05 | 6 |
| B-2 | 55.61 | 730 | 2.95 | 374 | 660 | 260 | 620 | 2.00 | 6 |
| B-3 | 56.23 | 680 | 1.95 | 255 | 570 | 164 | 550 | 1.90 | 7 |
| C-2 | 55.35 | 620 | 3.35 | 355 | 490 | 231 | 420 | 1.92 | 6 |
| D-2 | 55.74 | 730 | 3.14 | 323 | 610 | 188 | 560 | 1.80 | 6 |
| E-2 | 55.98 | 690 | 3.33 | 349 | 610 | 220 | 560 | 1.88 | 6 |
| E-3 | 56.24 | 660 | 2.93 | 346 | 590 | 226 | 570 | 1.92 | 6 |
| F-2 | 56.46 | 640 | 2.24 | 272 | 560 | 181 | 520 | 1.96 | 6 |
| H-2 | 55.71 | 590 | 2.76 | 317 | 510 | 181 | 450 | 1.76 | 6 |
| G-4 | 56.66 | 600 | 1.21 | 99 | 540 | 39 | 640 | 1.48 | 7 |
| Commercial products | 57.44-57.58 | 680-690 | 3.02-3.28 | 270-310 | 590-620 | 160-190 | 500-570 | 1.80-1.85 | 6 |

Figure 5:
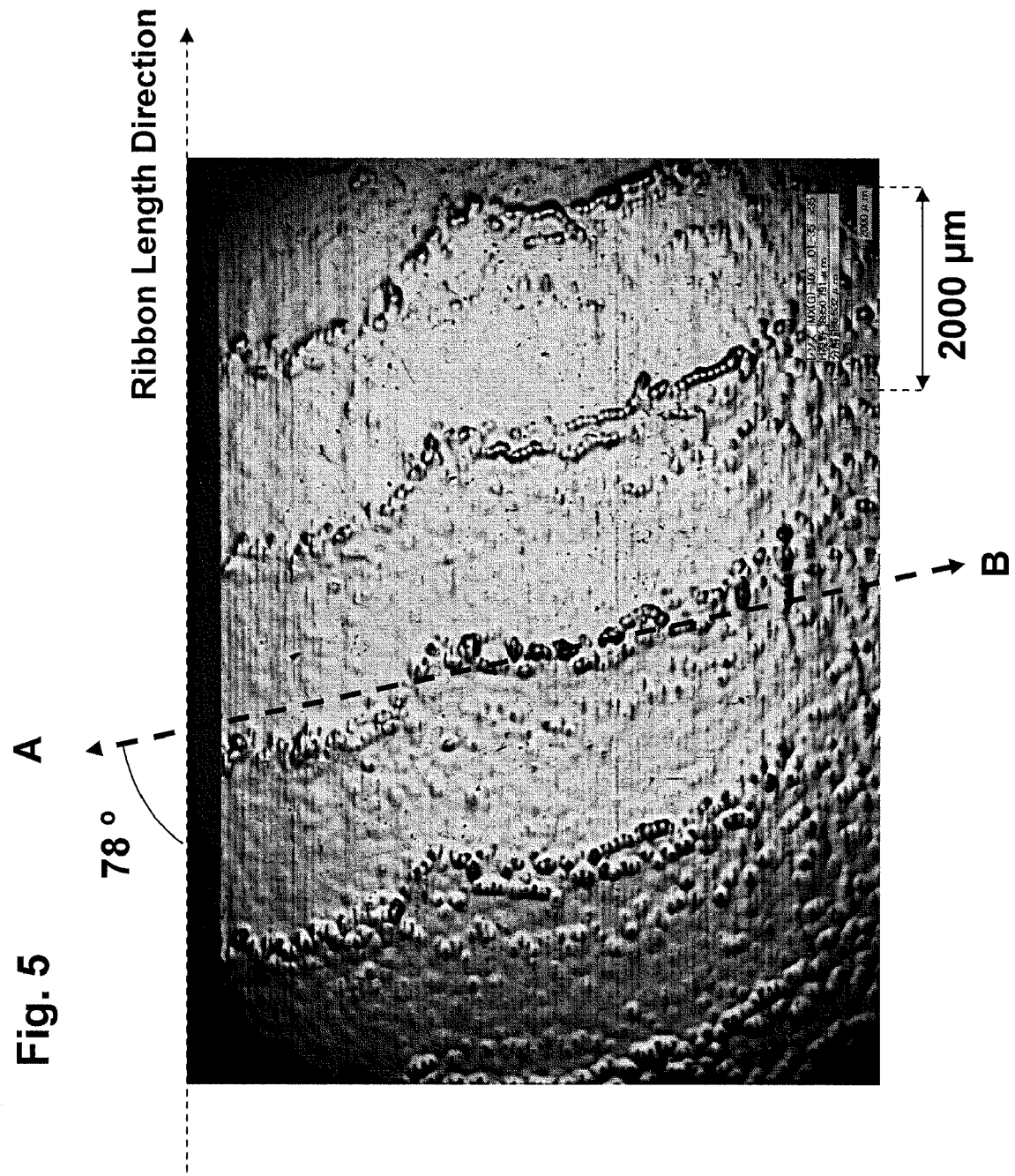
FIG. 5 is a laser microscopy image of ribbon surface facing liquid metal solidification surface for an amorphous metal ribbon which is outside the scope of the present invention, line AB being the magnetic anisotropy direction, which is 78 degree away from the ribbon length direction, and the line AB coincides with the surface line direction.

Since signal V1 is the tracking signal in commercial electronic article surveillance systems, high V1 voltage amplitude is preferred. In the commercial products, the maximum V1, $V1_{max}$, ranged from 160 to 190 mV in the signal detecting circuit of Example 1. As Table IV indicates, strips made from the alloys A, B, C, D, E, F and H in Table I showed $V1_{max}$ exceeding 160 mV. All of these ribbon strips had FS exceeding 1.9 kHz and the characteristic time constant τ exceeding 1.8 ms, indicating that these strips were qualified to be used in two-strip markers in commercial electronic article surveillance systems. The two-ribbon strip marker G-4 which had the ribbon surface pattern of FIG. 5 showed $V1_{max}$ of 39 mV, which was too low to be used as an electronic article surveillance marker in commercial systems.

A marker, also known as a sensor element, with one rectangular amorphous magnetostrictive alloy strip or a plurality of rectangular amorphous magnetostrictive alloy strips prepared in accordance with embodiments of the present invention, such as the one exemplified in FIG. 1 is utilized in an electronic article surveillance system illustrated in FIG. 9. As shown, an article 902 having a marker 901 according to an embodiment of the present invention is placed in an interrogation zone 903 equipped with a pair of AC field excitation coils 912, which is driven by an electronic device 910 consisting of a signal generator 913 and an AC amplifier 914. The electronic device 910 is programmed to excite marker strips of the embodiment of the present invention up to a predetermined time period, at which time the excitation is terminated. After the termination of the excitation in coils 912, a signal detected in the signal receiving coils 911 is fed to a signal detection circuit box 916, which is tuned to a resonance frequency of the marker in the interrogation zone 903. The excitation field termination and the onset of signal detection are controlled by a circuit box 915. The signal detector 916 is connected to an identifier 917, which conveys a result of the interrogation to an interrogator. When article 902 with an electronic surveillance marker of an embodiment of the present invention 901 exits the interrogation zone 903, the marker is deactivated by a demagnetizing field, if desired.

EXAMPLE 1

The magnetomechanical performance was determined in a set-up in which a pair of coils supplying a static bias field and the voltage appearing in a signal detecting coil compensated by a bucking coil was measured by an oscilloscope and a voltmeter. The measured voltage therefore is detecting-coil dependent and indicates a relative signal amplitude. The exciting AC field was supplied by a commercially available function generator. The function generator was programmed to excite a marker strip or strips of the present invention for 3 msec, after which period the excitation was terminated, and the signal decay was measured with time. The data thus taken were processed and analyzed with commercially available computer software.

EXAMPLE 2

A commercially available DC BH loop measurement equipment was utilized to measure magnetic induction B as a function of applied field H. The magnetic induction B became invariant with the applied field near 4000 A/m, indicating the materials were magnetically saturated. The magnetic induction at 4000 A/m was then identified as the saturation magnetic induction, $B_s$.

EXAMPLE 3

Conventional optical microscopy did not produce enough contrast in the image of ribbon surface pattern which was faintly visible to naked eyes. A commercially available laser microscopy, however, resulted in the improvement of ribbon surface images. Examples are shown in FIGS. 3 and 5.

In accordance with an embodiment of the invention, the at least one marker strip has a discrete length and exhibits magnetomechanical resonance at a length-related frequency.

In accordance with an embodiment of the invention, electronic article surveillance system has a capability of detecting resonance of a sensor element or a marker, and comprises a surveillance system tuned to predetermined surveillance magnetic field frequencies, wherein the surveillance system detects a marker that is adapted to mechanically resonate at a preselected frequency, and has at least one ductile magnetostrictive marker strip cut from an amorphous ferromagnetic alloy ribbon that has a magnetic anisotropy direction at an angle between 80 and 90 degrees away from ribbon's length direction and in ribbon's plane, which is introduced during ribbon casting by adjusting casting conditions and exhibits magnetomechanical resonance under alternating magnetic field excitation with a static bias field.

In accordance with an embodiment of the invention, the amorphous ferromagnetic alloy has a composition based on $Fe_a$—$Ni_b$—$Mo_c$-$B_d$ with $35 \leq a \leq 42$, $38 \leq b \leq 45$, $0 \leq c \leq 5$, $11 \leq d \leq 17$ and $a+b+c+d=100$, up to 3 atom % of Mo being optionally replaced by Co, Cr, Mn and/or Nb and up to 1.5 atom % of B being optionally replaced by Si and/or C.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sensor element of a magnetomechanical resonant electronic article surveillance system, comprising:
at least one ductile magnetostrictive marker strip cut from an amorphous ferromagnetic alloy ribbon, wherein
said ribbon having a ribbon length direction, a ribbon plane, and a line-like surface pattern, said surface pattern having a surface line direction,
said at least one marker strip having a direction of magnetic anisotropy being at an angle between 80 and 90 degrees away from said ribbon length direction and in said ribbon plane,
said surface line direction coinciding with said direction of magnetic anisotropy,
said direction of magnetic anisotropy being introduced during ribbon casting by adjusting casting conditions, and
said at least one marker strip exhibiting a magnetomechanical resonance under an alternating magnetic field excitation with a static bias field.

2. The sensor element of claim 1, wherein the amorphous ferromagnetic alloy ribbon has a saturation induction ranging from 0.8 tesla to 1.0 tesla.

3. The sensor element of claim 2, wherein the amorphous ferromagnetic alloy ribbon has a saturation magnetostriction ranging from 9 ppm to 14 ppm.

4. The sensor element of claim 2, wherein the amorphous ferromagnetic alloy ribbon has a composition based on $Fe_a$—$Ni_b$—$Mo_c$-$B_d$ with $35 \leq a \leq 42$, $38 \leq b \leq 45$, $0 \leq c \leq 5$, $11 \leq d \leq 17$ and $a+b+c+d=100$, up to 3 atom % of Mo being optionally replaced by Co, Cr, Mn and/or Nb and up to 1.5 atom % of B being optionally replaced by Si and/or C.

5. The sensor element of claim 4, wherein the amorphous ferromagnetic alloy ribbon is an alloy having a composition of one of $Fe_{41.3} Ni_{38.2} Mo_{3.6} B_{16.3} Si_{0.6}$, $Fe_{37.6} Ni_{44.9} MO_{4.4} B_{11.5} Si_{1.35} CO_{0.1} Cr_{0.15}$, $Fe_{37.2} Ni_{41.2} Mo_{3.6} B_{16.1} Si_{0.9} C_{0.6} Co_{0.1} Cr_{0.3}$, $Fe_{37.1} Ni_{42.2} Mo_{3.7} B_{16.3} Si_{0.7}$, $Fe_{36.9} Ni_{42.0} Mo_{3.9} B_{16.2} Si_{0.7} CO_{0.1} Cr_{0.2}$, $Fe_{36.4} Ni_{42.6} Mo_{3.9} B_{15.9} Si_{0.9} Cr_{0.3}$, $Fe_{36.0} Ni_{42.3} Mo_{3.9} B_{16.6} Si_{0.8} Co_{0.1} Cr_{0.3}$, and $Fe_{35.8} Ni_{43.5} Mo_{3.5} B_{16.4} Si_{0.6} Co_{0.1} Cr_{0.1}$.

6. The sensor element of claim 1, wherein the at least one marker strip has a discrete length and exhibits magnetomechanical resonance at a length-related frequency.

7. The sensor element of claim 6, wherein the at least one marker strip has a length ranging from about 35 mm to about 40 mm.

8. The sensor element of claim 7, wherein the at least one marker strip has a marker strip width ranging from about 5 mm to about 8 mm.

9. The sensor element of claim 8, wherein the at least one marker strip has a characteristic time constant for magnetomechanical resonance signal decay ranging from about 1 msec to about 2 msec.

10. The sensor element of claim 9, wherein the at least one marker strip has a resonance frequency shift exceeding 1.9 kHz from its minimum resonance frequency to its near highest observable resonance frequency.

11. The sensor element of claim 1, wherein two marker strips are stacked or placed side-by-side.

12. The sensor element of claim 1, further including at least one bias magnet strip placed along the at least one marker strip's direction.

13. The sensor element of claim 12, wherein the at least one marker strip is housed in a cavity separated from the bias magnet strip.

14. An electronic article surveillance system, comprising:
a surveillance system tuned to predetermined surveillance magnetic field frequencies, wherein
said surveillance system to detect a magnetomechanical resonance from a sensor element,
said sensor element being adapted to mechanically resonate at a preselected frequency and having at least one ductile magnetostrictive marker strip cut from an amorphous ferromagnetic alloy ribbon,
said ribbon having a ribbon length direction, a ribbon plane and a line-like surface pattern, said surface pattern having a surface line direction,
said at least one marker strip having a magnetic anisotropy direction being at an angle between 80 and 90 degrees away from said ribbon length direction and in said ribbon plane,
said surface line direction coinciding with said direction of magnetic anisotropy,
said magnetic anisotropy direction being introduced during ribbon casting by adjusting casting conditions, and
said at least one marker strip exhibiting a magnetomechanical resonance under an alternating magnetic field excitation with a static bias field.

* * * * *

UNITED STATES PATENT AND TRADEMARK OFFICE
CERTIFICATE OF CORRECTION

PATENT NO. : 8,366,010 B2
APPLICATION NO. : 13/171968
DATED : February 5, 2013
INVENTOR(S) : Ryusuke Hasegawa et al.

It is certified that error appears in the above-identified patent and that said Letters Patent is hereby corrected as shown below:

In the Claims:

Column 12, Line 37,   In Claim 4, delete "$MO_{4.4}$" and insert -- $Mo_{4.4}$ --, therefor.
Column 12, Line 38,   In Claim 4, delete "$CO_{0.1}$" and insert -- $Co_{0.1}$ --, therefor.
Column 12, Line 40,   In Claim 4, delete "$CO_{0.1}$" and insert -- $Co_{0.1}$ --, therefor.

Signed and Sealed this
Eleventh Day of June, 2013

Teresa Stanek Rea
*Acting Director of the United States Patent and Trademark Office*